United States Patent [19]
Nordquist

[11] Patent Number: 5,906,378
[45] Date of Patent: May 25, 1999

[54] COUPLING ADAPTER

[75] Inventor: B. Hakon Nordquist, Taby, Sweden

[73] Assignee: System 3R International AB, Vallingby, Sweden

[21] Appl. No.: 08/812,394

[22] Filed: Mar. 5, 1997

[30]     Foreign Application Priority Data

Mar. 5, 1996 [DE] Germany ............................. 196 08 416

[51] Int. Cl.[6] ............................. B23B 31/22; B23B 31/30
[52] U.S. Cl. .................... 279/4.06; 219/69.15; 279/4.04; 279/20; 279/75; 279/905; 409/234
[58] Field of Search ....................... 219/69.15; 279/4.04, 279/4.06, 75, 905, 20; 409/232–234

[56]                References Cited

U.S. PATENT DOCUMENTS

| | | | |
|---|---|---|---|
| 4,745,674 | 5/1988 | Abe et al. ............................... | 279/4.06 |
| 4,855,558 | 8/1989 | Rambro ................................... | 279/4.06 |
| 5,791,803 | 8/1998 | Nordquist ............................. | 219/69.15 |

FOREIGN PATENT DOCUMENTS

| | | |
|---|---|---|
| 0 255 042 | 2/1988 | European Pat. Off. . |
| 1 929 659 | 12/1969 | Germany . |
| 1 777 257 | 5/1970 | Germany . |
| 26 46 951 | 4/1978 | Germany . |
| 35 27 105 | 2/1986 | Germany . |
| 93 10 325 | 11/1993 | Germany . |
| 42 24 872 | 2/1994 | Germany . |
| 833048 | 4/1960 | United Kingdom . |
| 1 277 096 | 6/1972 | United Kingdom . |

OTHER PUBLICATIONS

Patent Abstracts of Japan, Publication No. 59124539, Jul. 1984.
Patent Abstracts of Japan, Publication No. 63300862, Aug. 1988.

*Primary Examiner*—Steven C. Bishop
*Attorney, Agent, or Firm*—Jacobson, Price, Holman & Stern, PLLC

[57]                ABSTRACT

A coupling adapter (1) for positioning a tool (90) in a particular given position with high repetitive precision on a chuck (80) that can be activated by a medium for a machine tool. The chuck (80) is equipped with elements (52, 54, 82, 55, 57, 58) of a first holding system and the tool (90) with elements of a second holding system, with a pressure-medium source that is controlled by a central control device and connected to the chuck (80) through a first medium channel (81) provided in the machine tool. The coupling adapter (1) is provided on a first end face with counter-elements (52, 54, 55, 56, 57, 58) of the first holding system and on a second end face (29) with counter-elements of the second holding system and has a device on the chuck (80) for clamping depending on the medium pressure and a holding device for the tool (90). The holding device for the tool (60, 75, 76) is connected to the pressure-medium source through a second medium channel (72, 85), which extends through the coupling adapter (1) and the chuck (80).

17 Claims, 3 Drawing Sheets

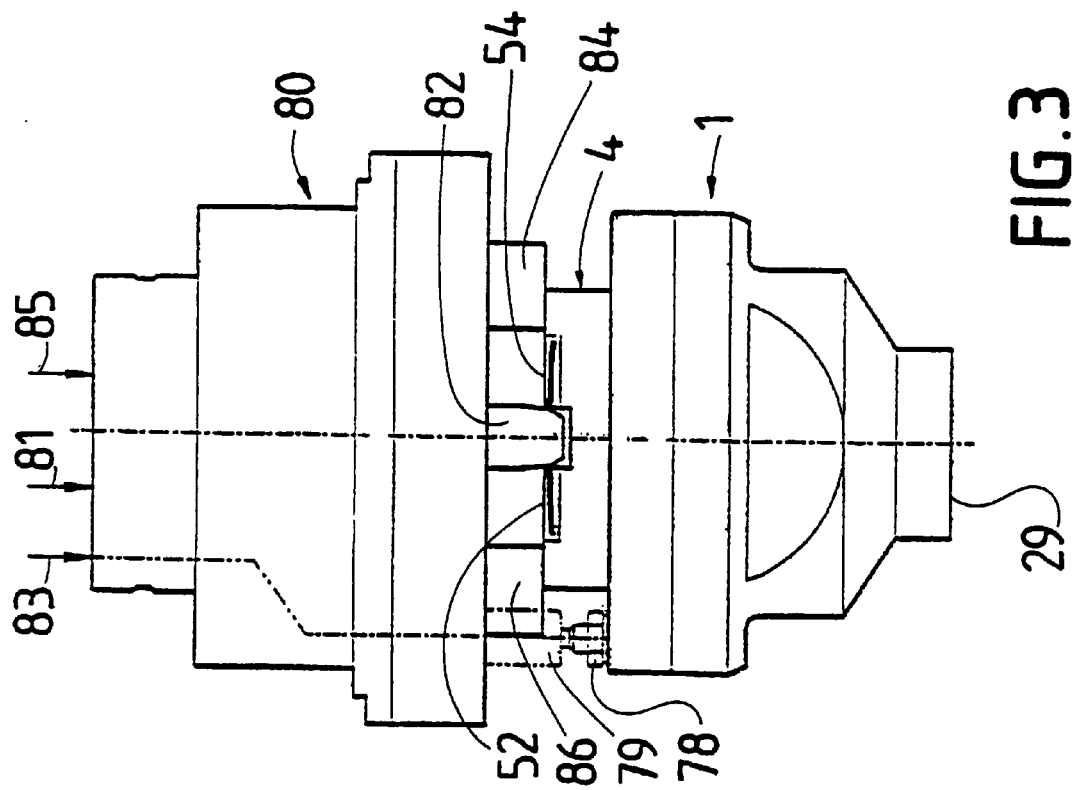
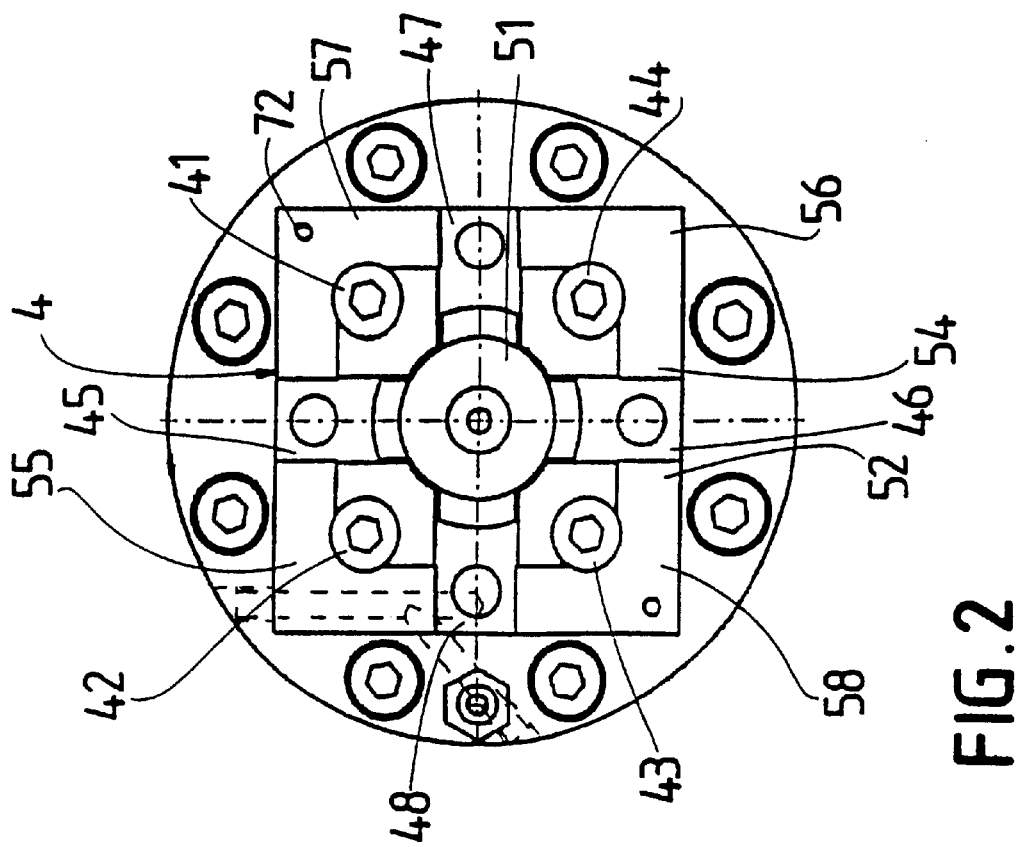
FIG. 3
FIG. 2

COUPLING ADAPTER

The invention concerns a coupling adapter for positioning a tool in a particular given position with high repetitive precision on a chuck that can be activated by a medium for a machine tool, whereby the chuck is equipped with elements of a first holding system and the tool with elements of a second holding system, with a pressure-medium source that is controlled by a central control device and connected to the chuck through a first medium channel provided in the machine tool. The coupling adapter is provided, on a first end face, with counter-elements of the first holding system and on a second end face with counter-elements of the second holding system and has a clamping device on the chuck depending on the medium pressure and a holding device for the tool, whereby the holding device for the tool is connected to the pressure-medium source through a second medium channel, which extends through the coupling adapter and the chuck.

Various holding systems are known, which are described in detail in documents DE 26 46 951 C3 and EP 255,042 B1 (U.S. Pat. No. 4,855,558), incorporated by reference herein. With a holding system of this type, a work-piece to be processed can be coupled or held, possibly by means of a work-piece carrier, to the chuck of a machine tool, especially an electrical-discharge machine, with extraordinarily high precision. Since the work-piece, for example an electrode, can be used as a tool after it has been processed, the concept of tool used to described the present invention also covers the work-piece.

Selection of the holding system to be used in each case depends on, among other things, the type of processing or even on the weight of the tools. On the other hand, the machine tool is provided with a pre-determined holding or coupling system, so that a desire arises for a transition piece called an adapter, which permits the transition from the holding system on the machine side to the holding system adjusted to the work-piece without loss of precision in positioning. The operation of modern machine tools is controlled numerically by means of a central control device that makes automatic attachment and release of an adapter to the chuck of the tool machine possible by means of a tension bolt. The tension bolt can have on the side a profile adapted to the gripper of an automatic exchange device, by means of which the tension bolt can be manipulated.

The invention is therefore based on simplifying the task of providing the coupling adapter mentioned above. For this, according to the invention, it is provided that the holding device is connected to the pressure-medium source through a second medium channel, which extends through the coupling adapter and the chuck. The coupling adapter according to the invention thereby becomes accessible to numerical control by the central control unit, so that attachment of a tool to the coupling adapter coupled to the chuck, and also its release, can be accomplished automatically. The invention expands the possibilities for controlling the machine tool by referring to a second reference plane, which differs from the reference plane used up to now only by a constant that is determined by the pre-determined measurement of the adapter in the z-direction.

In a preferred embodiment of the invention, it is recommended that the transition from the second medium channel of the coupling adapter to the chuck be fed through an element/counter-element pair of the first holding system. This element/counter-element pair can be any pair that positions the coupling adapter unambiguously with respect to the chuck in the axial direction (z-direction). If, in a further development of the invention, the tool is coupled to a tension anchor that can be inserted into the tool holding device, it is recommended that the second medium channel open into a pressure chamber of the coupling adapter, in which an elastically applied piston can be moved, whereby the piston controls the radial meshing of arresting elements, for example balls, in radial recesses in the tension anchor.

In another preferred embodiment of the invention, it is provided that an external contour, the size of which is conveniently equal to that of the profile of the tension bolt, is formed on the tool that can be coupled to the tension anchor. With this, the tool becomes capable of being manipulated by grippers, advantageously, in particular, by grippers with the same geometry.

To the extent that the first and/or the second holding system has/have spring elements, another development of the invention, of the type where these spring elements are formed on the upper side and/or the lower side of the coupling adapter is recommended.

Other advantageous embodiments of the objects of the invention are within the scope of the claims and sub-claims.

The invention will be described in detail below by means of the embodiment example shown in the attached diagrams.

FIG. 2 shows a top view of the coupling adapter according to FIG. 1 after the tension bolt has been removed;

FIG. 3 shows a schematic representation of a chuck with tension bolt attached;

Figure 1:
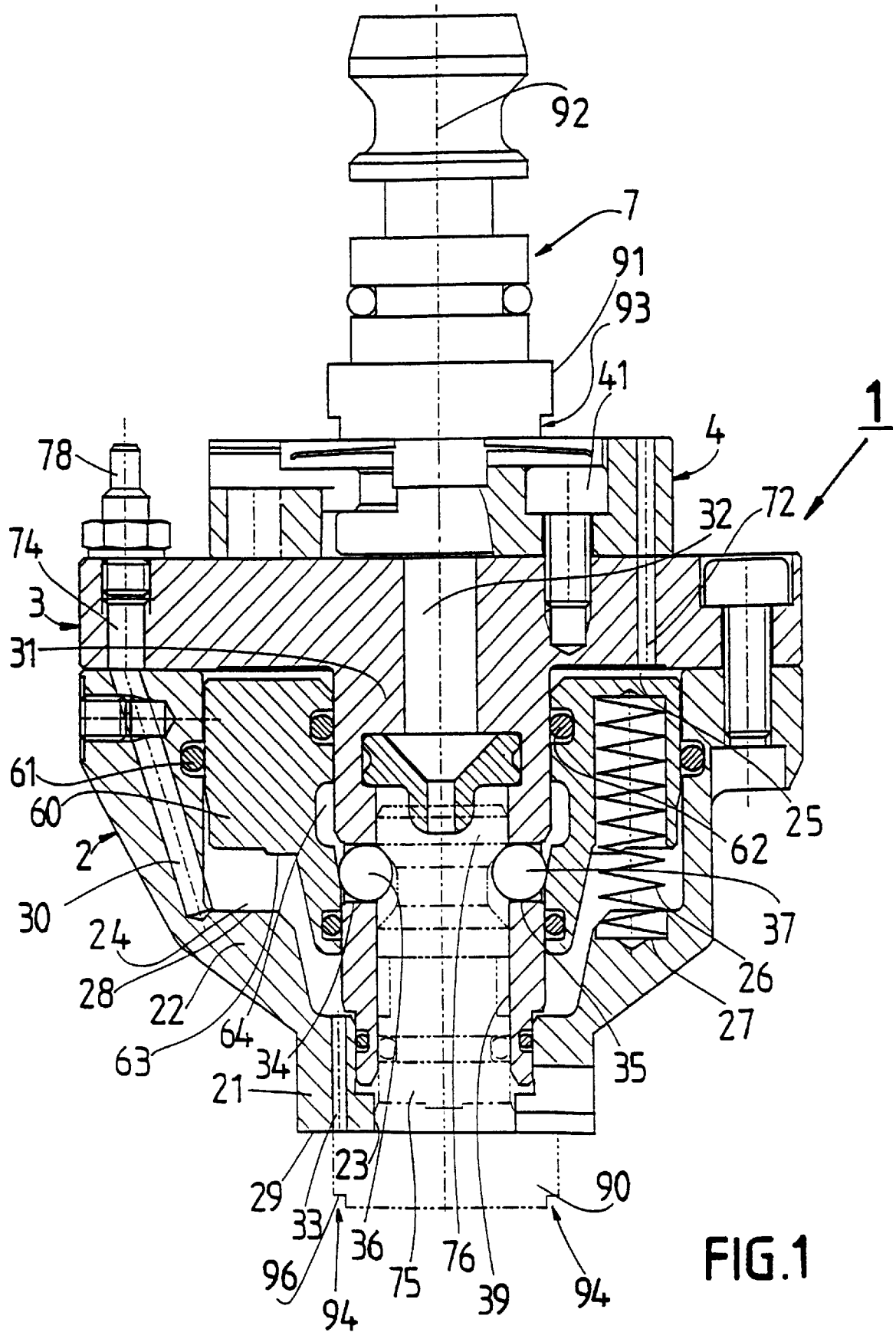
FIG. 1 shows an axial section through a coupling adapter with a tension anchor and tension bolt.

The coupling adapter designated as a whole by 1 has a lower casing part 2, with essentially the shape of a pot, the top opening of which is closed by a lid 3 that is screwed on, with the exception of a central channel 32 in the lid 3. On the free upper side of the lid 3 an extension 4 is screwed on by means of several screws 41, 42, 43, 44. The square-shaped extension 4 has on its upper side four radially arranged grooves 45, 46, 47, 48, which open into a stepped circular central passage hole 51 drilled in the extension 4. Between every pair of grooves 45, 47, 46, 48, four angled surface segments 57, 56, 58, 55, ground flat and lying in a plane, are defined, which serve together as z-reference surfaces. Each of the grooves has, at its transition to the next surface segment, opposing lips formed by back-cuts as elements of a first holding system, which are denoted by 52 and 54 at groove 46. The first holding system is formed in the manner described in detail in document EP 255,042 B1 (U.S. Pat. No. 4,855,558), mentioned above. Correspondingly, the chuck, shown only schematically in FIG. 3 and denoted by 80, has strips protruding from its lower side, which are arranged to fit into the grooves 45, 46, 47, 48 cross-wise, and when, for example, the strips 82 penetrate between the axially elastic lips 52, 54 as the coupling adapter 1 is attached to the chuck 80, they thereby position the coupling adapter 1 unambiguously in the x- and y-directions, perpendicular to the vertical z-direction. In addition, on the lower side of the chuck 80, there are four tabs (or posts), each of which sits on one of the surface segments 55, 56, 57, 58 to define the spanning or holding path in the z-direction as a z-reference, as is shown in FIG. 3 for tabs 84 and 86 with reference to surface segment 56, 58.

In a manner known from the above-mentioned European document, a tension bolt 7 is inserted into the passage hole 51 in the extension 4, which bolt is placed in a corresponding recess in the chuck 80 and can be pulled in by means of compressed air to attach the coupling adapter 1 to the chuck 80.

From the lower side of the lid 3, which lies at its edge on the lower part 2 of the casing an extension 31 in the shape of a single tube extends to the middle, which has a stepped hole 39 aligned with the central channel 32, and extends through the interior of the casing 2 as far as a central opening 23 in the lower end segment 21 of the casing part 2. The interior space enclosed by the wall 22 of the casing part 2 and the extension 31 thus forms a ring-shaped cylinder chamber 24, in which a piston 60 can be moved axially. The piston 60 is sealed by ring seals 61 or 62 against a cylindrical segment of the inner surface of the wall 22 or the opposite outer wall of the extension 31; between the upper side of the piston 60 and the lower side of the lid 3 there remains a chamber 25, into which a pressure-medium channel, or a second medium channel, opens. The pressure-medium channel 72 passes through the lid 3 and the extension 4 and opens onto the upper surface segment 57 at a point at which the tabs of the chuck 80 come to placed when the coupling adapter 1 is attached. As is known from document EP 255,042 B1, a pressure-medium channel, connected to a pressure-medium source, not shown, penetrates through each of the tabs. Release of the pressure medium from the pressure-medium source is shown in FIG. 3 by the arrow 85. It is in contact with the pressure-medium channel 72 when the coupling adapter 1 is thus attached to the chuck 80.

If a pressure medium, for example compressed air, is fed into the pressure-medium channel 72, the piston 60 can yield to the pressure that has built up in the chamber 25 against the effect of a spring 26 that is braced on the inner side 27 of the wall 22, in a downward direction, specifically at most until the lower side 63 of the piston 60 comes to rest on an inner level 28 of the wall 22. When the piston 60 is resting on the level 28, a ring-shaped recess 64 in the piston 60 comes to radial openings 34, 35 in the extension 31, in which openings balls 36, 37 can move radially as arresting elements. The balls 34, 37 can then yield in the radial direction in the recess 64 and release the path directed outward of a tension anchor 75 down from the hole 39 and the opening 23.

If pressure is released from the pressure-medium channel 72, the piston 60 travels upward due to the action of the spring 26, so that the balls 36, 37 are pushed radially inward by the piston 60 in the openings 34, 35, and they protrude in the hole 39 in such a way that they can support a collar 76 on the tension anchor 75. Therefore, when an impulse of compressed air is applied through the medium channel 72 to the chamber 25, the tension anchor 75 can be pulled away, downward from the coupling adapter 1, for example by an automatic gripper. On the other side, the tension anchor 75 is held in the coupling adapter 1 by the pressure spring 26 when there is no pressure in the chamber 25. It will be understood that giving a compressed-air impulse to the chamber 25 can be controlled by the central control of the machine tool, not shown, to the spindle sleeves of which the chuck is attached in this way. Moreover, in a practical implementation, several pressure springs 26 can be provided in the circumferential direction.

Figure 4:
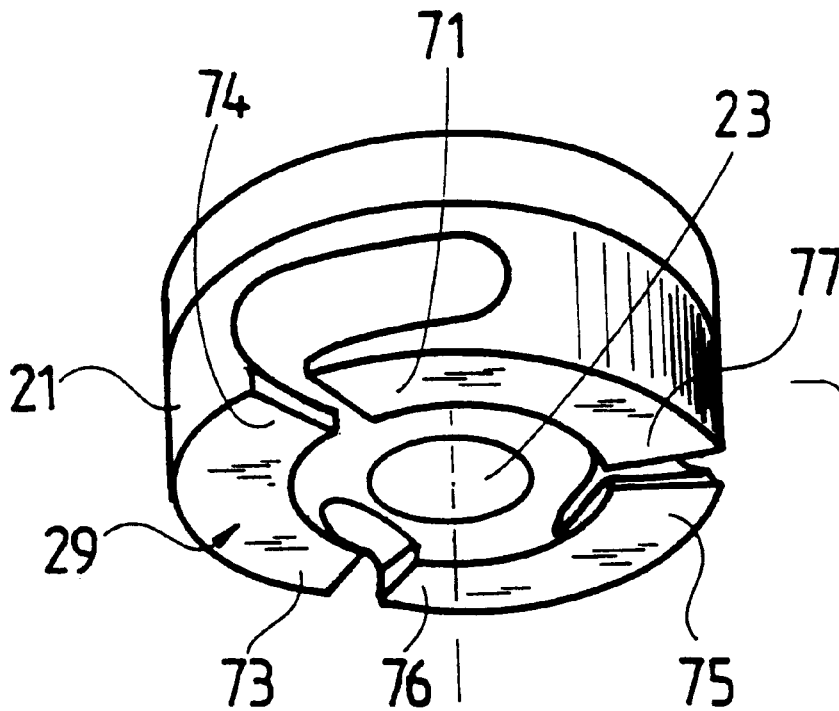
FIG. 4 shows a schematic perspective view of the lower part of the coupling adapter and the associated tool.
Figure 4:
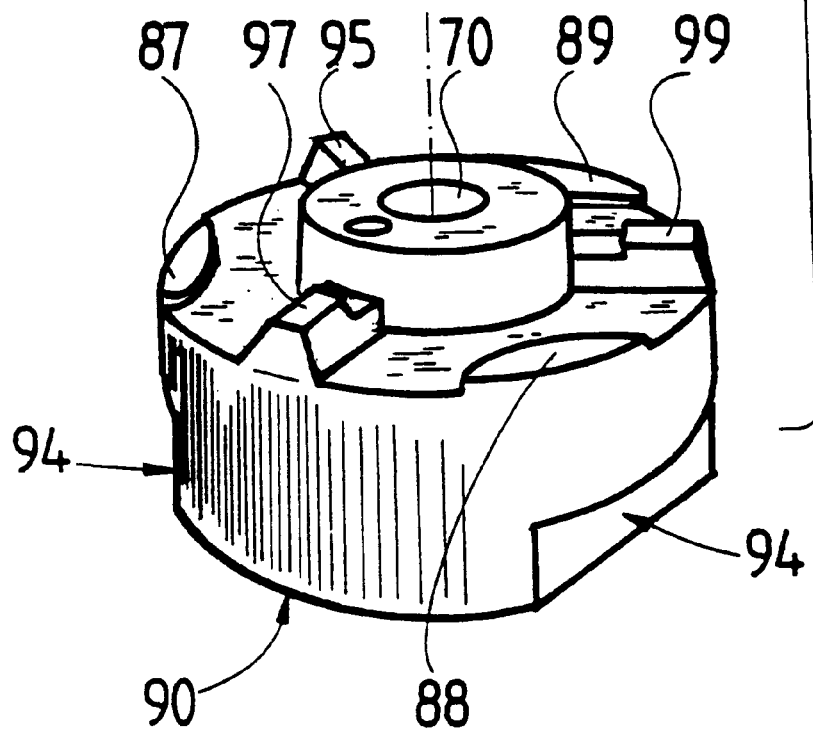

The tension anchor 75 carries a tool 90, of which the part of the upper surface next to the tension bolt 75 is provided with elements of a second holding system. Correspondingly, at the free end 29 of the coupling adapter 1, counter-elements of the second holding system are formed, which work together or cooperate with the elements on the tool 90 when the tension bolt 75 is attached. This second holding system can be either the one described in document DE 26 46 951 C3, or else be shaped in the way shown in FIG. 4. At the free end 29, three spring blades 71, 73, 75, equally spaced in the circumferential direction, are formed by corresponding cuts, which are elastic in the direction of the axis 2. Each of the spring blades 71, 73, 75 ends at a given distance before a fixed stop 74, 76, 77, where the stops 74, 76, 77 are likewise spaced equally in the circumferential direction. Thus between each spring blade 74, 76, 77 and its associated opposite stop 74, 76, 77 there remains a gap, into which one each of three cone-shaped radial tongues 95, 97, 99, equally spaced in the circumferential direction, of the tool 90 can penetrate. The tongues 95, 97, 99 have a ridge width when viewed in the circumferential direction that is smaller that the width of the gap mentioned between each pair of spring blade and stop and a base width that is larger than the width of the gap mentioned. Therefore, if the tool 90 is attached to the coupling adapter (1) in the manner described by means of the tension anchor 75, which is anchored in a manner not shown in a central hole 70 of the work-piece 90, each of the tongues 95, 97, 99 presses into the gap between one of the spring blades 71, 73, 75 and the corresponding opposite stop 74, 76, 77. The penetration depth in the direction of the axis 92 is limited by the fact that the stop surfaces 87, 88, 89 formed on the upper side of the tool 90, which lie in a plane, come to rest on the free end surface 29. As shown, the stop surfaces 87, 88, 89 are at equal distances in the circumferential direction, and between every two neighboring tongues 95, 97, 99 a stop surface 87, 88, 89 is formed on the work-piece 90.

It can be seen from FIG. 1 that the tension anchor 75 can be inserted into the coupling adapter 1 in alignment with the middle axis 92 of the latter and that it is therefore likewise in alignment with the tension bolt 7.

The free end surface 29 lying perpendicular to the middle line 92 forms a z-reference for attachment of the work-piece 90. Through the end section 21, a compressed-air channel 33 is drilled, which communicates with the chamber 24. Another compressed-air channel 30 opens into the chamber 24, which channel is made through the upper part of the wall 22 and continues in a compressed-air channel 74 in the lid 3. At the end of compressed-air channel 74, a nipple 78 is screwed on, which communicates with a counter-piece 79 on the chuck 80 when the coupling adapter 1 is attached to the chuck 80. From the counter-piece 79, a compressed-air channel extends through the chuck 80 to the connection at the compressed-air source at arrow 83. As arrow 83 indicates, the compressed-air channel 74 is then supplied with compressed air under control of the central control unit when the tension anchor 75 is attached to the work-piece 90 against the coupling adapter 1 in the manner described. The compressed air that consequently flows out of the coupling adapter 1 through the chamber 24 and the compressed-air channel 33 cleans the counter-reference surface with respect to the reference surface 29 at the time of the attachment.

Arrow 81 shows the connection of the pressure-medium source to a compressed-air channel in the interior of the chuck 80, which is applied to release the coupling of the coupling adapter 1 to the chuck 80 and is called the first medium channel.

The tension bolt 7 has, like the tension bolt known from EP 255,042 B1, a section 91 which remains free after the tension bolt 7 is coupled to the coupling adapter 1 and the tension bolt 7 is inserted into the chuck between the chuck 80 and the upper side of the extension 4. At section 91, a profile 93 is formed, which is intended to work together with a counter-profile at the gripper of a manipulator, not shown, for example an automatic tool replacer. In the embodiment example shown, the profile 93 has two shoulders extending radially inward, opposite each other with respect to the middle line 92, which can support the gripper.

The tool 90, the upper side of which, located radially outside the tension anchor 75, is provided with the elements mentioned of the second holding system, has an outer contour 94 on the upper side lying opposite the coupling adapter 1, which contour consists, for example, of two shoulders 96 extending radially inward, symmetric with respect to the axis 92. The sizes and also the geometric shape of the profile 93 are the same as those of the outer contour 94. Therefore, the gripper mentioned can also grip the work-piece 90 on its outer contour 94 according to an offset corresponding to the extension of the coupling adapter 1 in the z-direction, and, after the chamber 25 is supplied with compressed air through the pressure-medium channel 72, pull the tension anchor 75 out of the hole 39. The offset mentioned is a constant machine parameter, which can be stored in the control unit, not shown. The control device can therefore either release the tension bolt 7 or the tension anchor 75 with the workpiece 90, in correspondence with the given control program, from the machine tool or attach it to the machine tool.

I claim:

1. A coupling adapter for coupling a chuck of a machine tool, such as an electrical discharge machine, with a tool so as to precisely and repetitively position the tool with respect to the chuck, said machine tool including a pressure medium source and central control system for controlling the pressure medium from the pressure medium source, said chuck including chuck face coupling elements extending from a face of said chuck, said tool including a tool anchor and tool face coupling elements extending from a face of said tool, wherein said coupling adapter includes a first end face having coupling adapter first coupling elements that are engageable with said chuck face coupling elements to define a first holding system for holding said coupling adapter in a predetermined reference plane with respect to said chuck and along a predetermined axial direction perpendicular to said reference plane, said coupling adapter further including a second end face having coupling adapter second coupling elements that are engageable with said tool face coupling elements to define a second holding system for holding said tool in a predetermined reference plane with respect to said coupling adapter and along a predetermined axial direction perpendicular to said reference plane, said coupling adapter further including a tool holding mechanism for retaining said tool anchor, said tool holding mechanism in pressure medium communication with said pressure medium source through a pressure medium channel that extends through said chuck and said coupling adapter.

2. An adapter according to claim 1 wherein said tool anchor is a tension bolt which can be inserted into said tool holding mechanism.

3. An adapter according to claim 2, wherein a side periphery of said tool is provided with an external contour to mesh with an automatic gripper.

4. An adapter according to claim 3, wherein said external contour is constructed on a part of the tool that is remote from said coupling adapter.

5. An adapter according to claim 4, wherein said external contour has at least two opposite shoulders facing radially inward.

6. An adapter according to claim 1 further comprising a tension bolt for coupling said coupling adapter to said chuck with a section projecting from said chuck and said coupling adapter which has a profile for meshing with an automatic gripper.

7. An adapter according to claim 6 wherein the size of said external contour is the same as that of said profile.

8. An adapter according to claim 1, wherein said pressure medium channel extends through said chuck face coupling elements and said coupling adapter first coupling elements of said first holding system.

9. An adapter according to claim 8 wherein said pressure medium channel opens into a pressure chamber limited by an elastically applied and axially movable piston.

10. An adapter according to claim 11 further comprising a further pressure medium channel which opens into the second holding system, said further pressure medium channel extending through the coupling adapter and also through the chuck.

11. An adapter according to claim 1 wherein said coupling adapter first coupling elements are at least partly elastic in the axial direction.

12. An adapter according to claim 1 wherein said coupling adapter second coupling elements are at least partly elastic in the axial direction.

13. An adapter of claim 1 wherein said tool holding mechanism includes a piston in communication with said pressure medium channel for releasing said tool anchor upon receipt of the pressure medium.

14. An adapter of claim 1 wherein said coupling adapter first coupling elements are of a different configuration than said coupling adapter second coupling elements.

15. An adapter of claim 1 wherein said each of said predetermined reference planes define x-y reference planes and each of said predetermined axial directions perpendicular to said reference planes define z-axis positions.

16. An adapter of claim 1 wherein each of said coupling adapter first and second coupling elements include planar surfaces defining z-axis positions.

17. An adapter of claim 16 wherein each of said coupling adapter first and second coupling elements include axially elastic lips for positioning said coupling adapter and tool in respective reference planes.

* * * * *